United States Patent
Aspesi

[11] Patent Number: 5,371,554
[45] Date of Patent: Dec. 6, 1994

[54] EYEGLASS FRAME RESTYLING ARRANGEMENT

[76] Inventor: Marilyn A. Aspesi, 22 Curtis St., Rockport, Mass. 01966

[21] Appl. No.: 833,341

[22] Filed: Feb. 10, 1992

[51] Int. Cl.$^5$ ............................................. G02C 11/02
[52] U.S. Cl. ............................................. 351/52; 351/51
[58] Field of Search ..................... 351/51, 52, 158, 83, 351/131

[56] References Cited

U.S. PATENT DOCUMENTS

| | | |
|---|---|---|
| 1,054,076 | 2/1913 | Adt ............................. 351/131 |
| 1,235,842 | 8/1917 | Reagan . |
| 1,919,336 | 7/1933 | Kuehn ......................... 351/131 |
| 2,068,273 | 1/1937 | Kirk ............................. 351/131 |
| 2,384,867 | 9/1945 | Williams ...................... 351/51 |
| 2,471,338 | 5/1949 | Massaro . |
| 2,479,754 | 8/1949 | Marks . |
| 2,594,395 | 1/1952 | Castelli . |
| 2,781,693 | 2/1957 | Brumby . |
| 2,786,391 | 3/1957 | Lutes . |
| 2,842,028 | 7/1958 | Belgard ....................... 351/52 |
| 3,473,869 | 10/1969 | Pluznik et al. . |
| 3,526,450 | 9/1970 | Berry ........................... 351/52 |
| 3,542,460 | 11/1970 | Smith et al. . |
| 3,589,802 | 6/1971 | Amaru . |
| 4,360,252 | 11/1982 | Solomon . |
| 4,813,775 | 3/1989 | Kaksonen . |

FOREIGN PATENT DOCUMENTS 280566 8/1988 European Pat. Off. ............ 351/52

Primary Examiner—William L. Sikes
Assistant Examiner—Hung Xuan Dang
Attorney, Agent, or Firm—Don Halgren

[57] ABSTRACT

An eyeglass frame assembly having grooves arranged in the lens, the grooves receiving a replacable U-shaped channel for changing the style and or color of a frame around an eyeglass lens. The lenses may have a groove to permit the exchange of a frame portion of the eyeglass assembly.

10 Claims, 3 Drawing Sheets

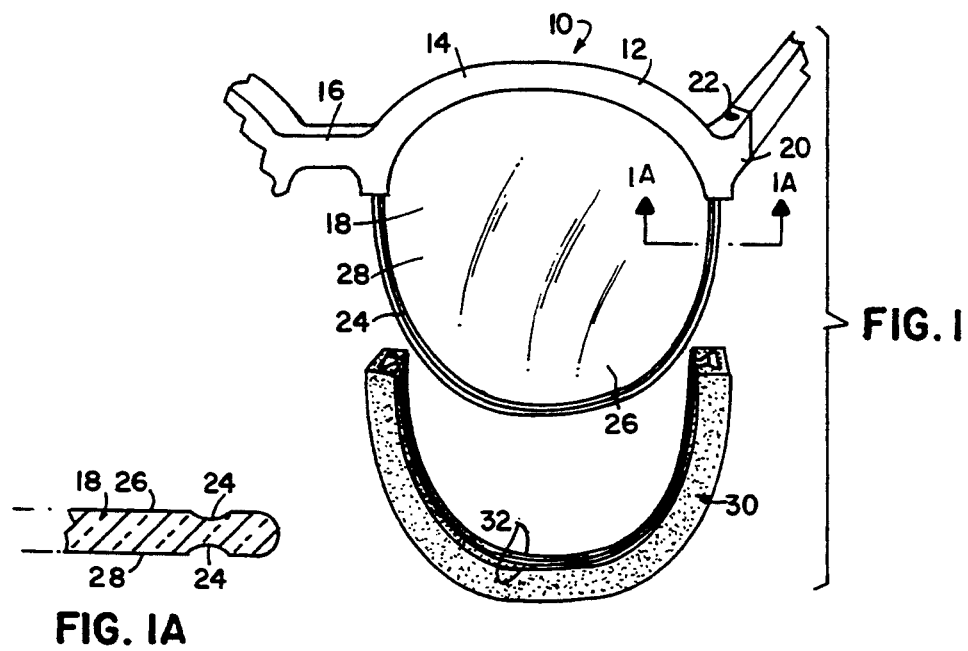
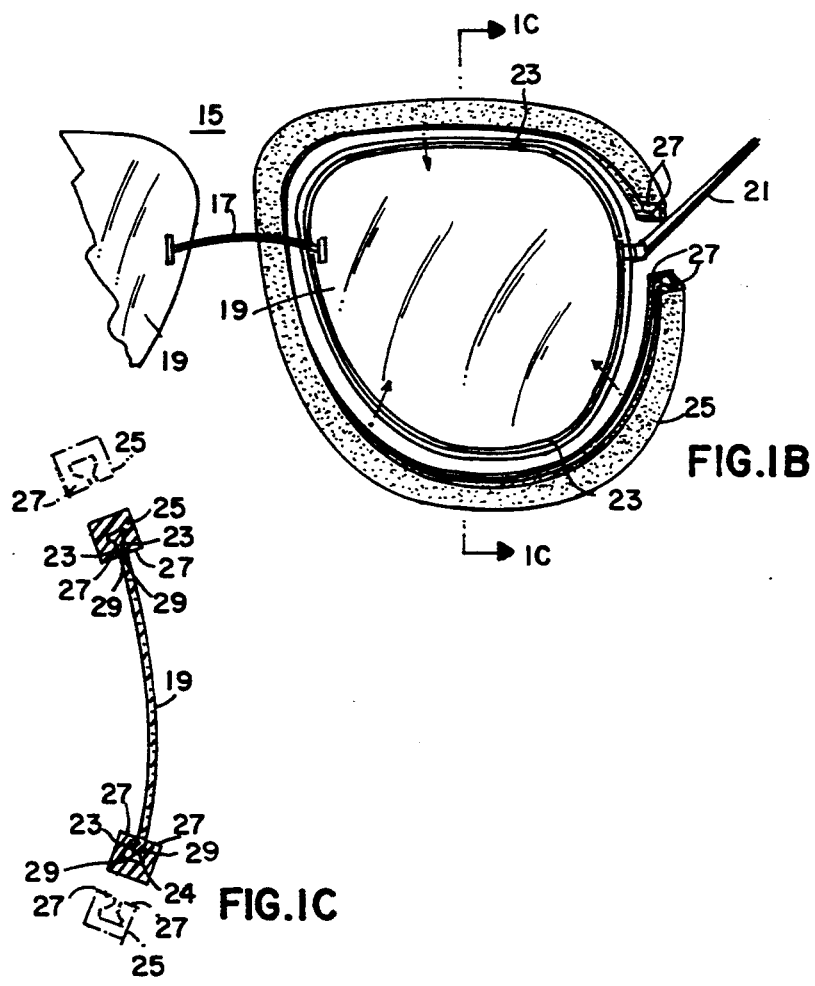

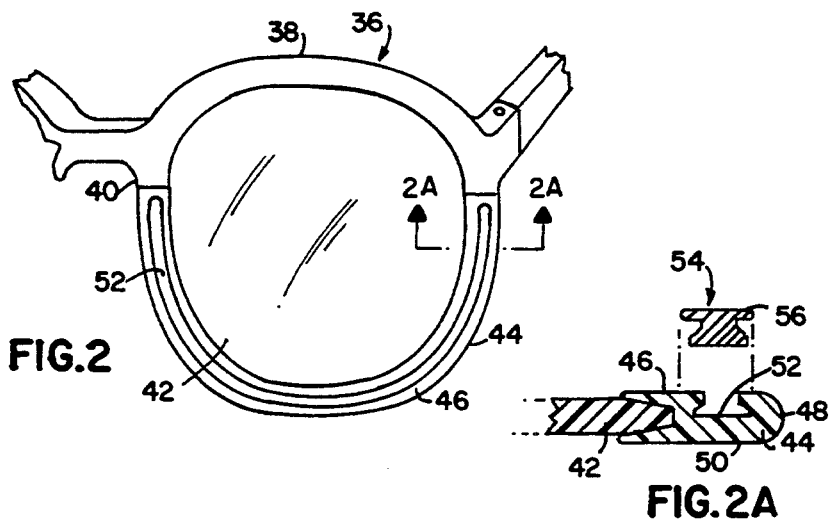
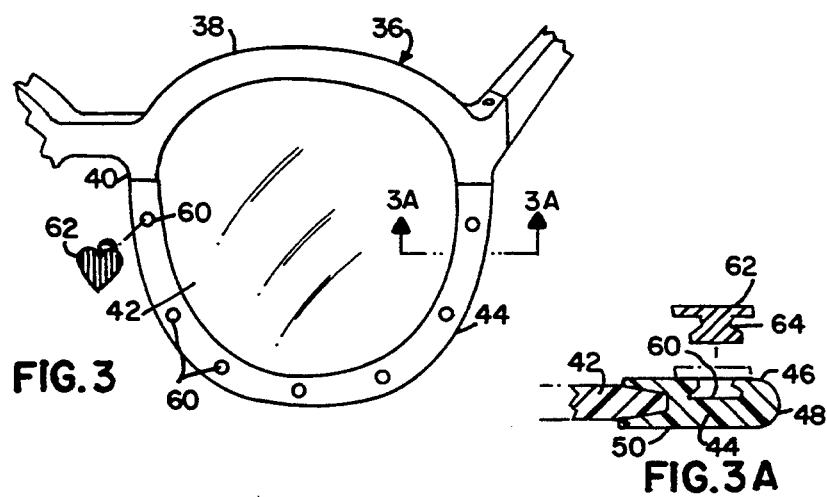
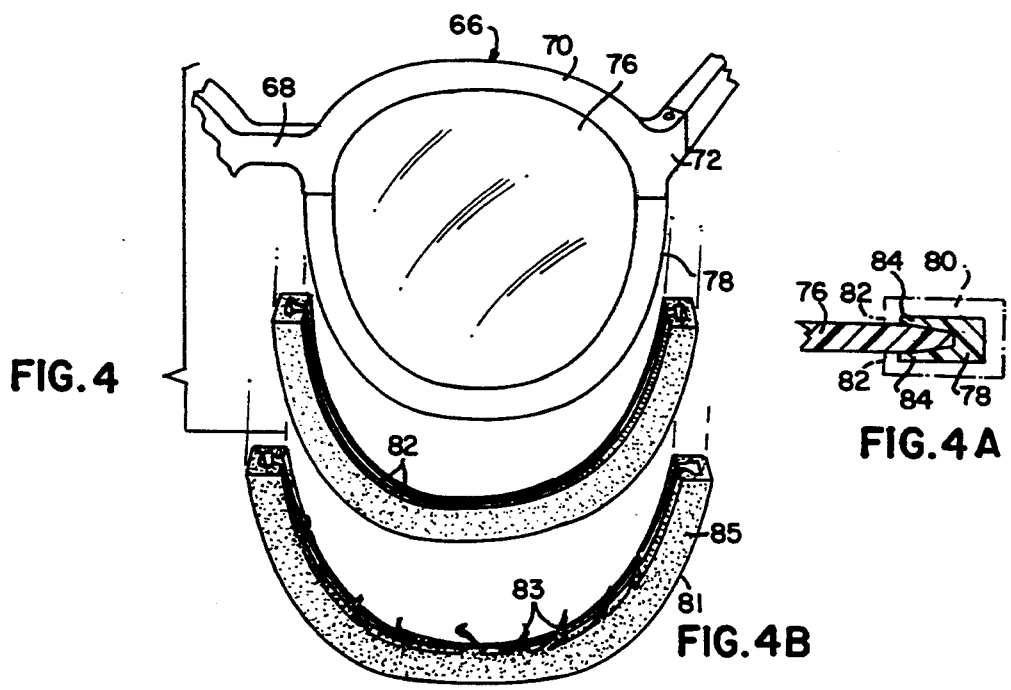

EYEGLASS FRAME RESTYLING ARRANGEMENT

BACKGROUND OF THE INVENTION (1) Field of the Invention

This invention relates to eyeglass frames and more particularly to means for readily changing the appearance and/or style of a pair of eyeglass frames.

(2) Prior Art

Maintanance of appearance and keeping up with style has always been a concern, and probably more so with people who wear eyeglasses. It is an object of the present invention to provide an eyeglass assembly which is readily adaptable to changes.

Hairstyles, colors, clothes and their tones, shapes and characteristics are changeable, literally from one day to the next. The eyeglass is something different. It has not been so adaptable.

Some attempts have been made however, to do something about eyeglasses. U.S. Pat. No. 1,235,842 to Reagan discloses a pair of goggles having a split frame to facilitate lens assembly therewithin. U.S. Pat. No. 2,471,338 to Massaro discloses an eyeglass frame which permits lenses to be interchanged from one pair to another, the frame having a hinged portion which opens to permit receipt of a lens therein. This is a somewhat delicate, expensive and complicated arrangement for swapping frames for a single pair of lenses.

U.S. Pat. No. 2,479,754 to Marks discloses a three piece frame for lenses where broken lenses are frequent. The components of the frame are hinged so as to be openable to permit replacement of a lens.

U.S. Pat. No. 2,594,395 to Castelli discloses a two piece eyeglass frame held together by a plurality of rivet-like pins. U.S. Pat. No. 2,781,693 to Bromby shows an eyeglass frame with interchangable lenses, each brow lens-retaining bar being hinged at their outer end, to the frame, to permit the lens to be removed from a channel shaped frame enclosing the lower portion of each lens. It is a further adaptation of a complicated and expensive eye piece frame.

H.R. Lutes received U.S. Pat. No. 2,786,391 on a lens frame sub-assembly which is mountable in a larger brow piece assembly, to accomplish a change in fashion from one brow piece assembly to another.

R.L. Smith et al were granted U.S. Pat. No. 3,542,460 for a snap-together frame permitting a user to exchange one frame for another for decorative reasons.

U.S. Pat. No. 3,473,869 was issued to Pluznik et al for an expansible frame so that lenses may be changed without additional tools, the frame being held together by a compression spring at each corner, permitting the frame to be biased apart so as to enlarge the opening for release of a/the lens(es).

E. Amaru received U.S. Pat. No. 3,589,802 discloses a lens frame which when one side of it comes unscrewed. the frame can be bent away to permit exchange of its lens.

Solomon was granted U.S. Pat. No. 4,360,252 for an eyeglass frame which includes a turnbuckle arrangement for spreading apart the lens enclosing frame portions, to permit the lenses to be exchanged by hand rotation of that/those turnbuckles.

A drawback of all the eyeglass frames encountered in the prior art, where fashion or decoration dictated the change, lenses were swapped from one frame to another. No attempt has been shown to add a feature in a simple and inexpensive manner to an existing eyeglass frame.

It is an object of the present envention to overcome the drawbacks of the prior art.

It is a further object of the present invention to provide an eyeglass frame assembly which can be adapted to any of various styles, sizes or colors chosen by the eyeglass wearer.

It is yet a further object of the present invention to provide an eyeglass frame assembly which can be changed or decorated in a simple, inexpensive and convenient manner.

BRIEF SUMMARY OF THE INVENTION

The present invention comprises an eyeglass frame assembly having capability to be decoratively changed by its wearer easily and inexpensively by selectively adding to the frame around the lenses.

The frame assembly of an eyeglass assembly of the present invention comprises a top bar for each eye element, connected by a nose bridge.

The top bar in the preferred embodiment is in secure engagement with a permanently affixed lens. A frame post extends rearwardly from the outer ends of each top bar. A frame arm is attached through a hinge to each frame post in a known manner.

The top bar extends only partway around the side portion of each lens. In a first embodiment, each lens has a peripheral groove disposed adjacent the edge thereof, which is not engaged by the top bar or the side portion.

This peripheral groove may be disposed on one or both sides of the lens. A replacable 'U'-shaped decorative member is matably disposable about the periphery of each lens, up to the bottom of each side portion. The decorative member being of 'U'-shape has parallel edges which are biased together so as to engage the or each opposed groove arranged around the periphery of the lens. The decorative member may be of different color or character than the top bar or frame arms.

In a further embodiment, the sides of the decorative members may have design features that flair up on one side of the decorative member so as to present on one side of the lens, a design feature viewable to an observer of the frame assembly.

In yet a further embodiment of the eyeglass frame assembly, the top bar is secured to the top edge of each lens, and a peripheral frame is attached fixedly therearound. The peripheral frame has a forward facing edge with an inverted omega shaped slot extending therearound. A longitudinal flexible insert is snappabley disposable in the slot. The insert may be removed and replaced by different inserts of different colors or outer shape. In a variation of this embodiment, the forward facing edge of the peripheral frame may have a plurality of inverted omega shaped openings. A plurality of removably insertable decorative pins may be inserted into those openings. Those pins may be of decorative or fanciful outer shapes and colors to configure attractive combinations to the eyeglass frame assembly.

In another embodiment, a peripheral frame is arranged about the sides and bottom of each lens similar to the aforementioned. A decorative member of generally 'U'-shape in cross-section, somewhat similar to an earlier discussed embodiment, except that the parallel edges of the decorative member biasedly secure themselves against the peripheral frame itself, not any grooves in the actual lens.

It is contemplated in this invention, that the channel shaped decorative member can be formed in long configurations, and cut by the ultimate consumer of the eyeglass frame, to his/her own decorative considerations. The channel shaped decorative members would be made in the form of a plastic extrusion, the opposed parallel edges having a built-in bias toward one another to provide the gripping characteristics thereof.

Another embodiment for an eyeglass frame comprises a top bar for gripping each lens for an eyeglass assembly. A nose bridging member is disposed between the inner sides of each top bar. A hinge is attached to the outer side of each top bar to which a frame arm is attached.

Each top bar of this eyeglass frame is of generally inverted "U"-shaped configuration. The lower parallel edges of each top bar has an inwardly directed lip that is biased towards its opposed lip. An eyeglass lens is slidably displacable in each top bar. Each eyeglass lens has an uppermost peripheral edge with a groove extending thereadjacent. The opposed lips of the lower parallel edges engage the grooves in the front and back side of the lens so as to secure it thereto.

Each eyeglass frame in this embodiment may be of different color or have other visual decorations or characteristics, permitting the wearer to use the same lenses for a series of different styles of eyeglass frames.

BRIEF DESCRIPTION OF THE DRAWINGS

The objects and advantages of the present invention will become more apparent when viewed in conjunction with the following drawings, in which:

FIG. 1 is a partial side elevational view of an eyeglass frame assembly constructed according to the principles of this invention;

FIG. 1A is a partial cross-sectional view of the lines 1A—1A shown in FIG. 1;

FIG. 1B is a partial side elevational view of an eyeglass frame assembly with an additional embodiment of that shown in FIG. 1;

FIG. 1C is a view taken along the lines 1C—1C of FIG. 1B;

FIG. 2 is a partial side elevational view of another embodiment of the eyeglass frame assembly shown in FIG. 1;

FIG. 2A is a partial cross-sectional view of the lines 2A shown in FIG. 2;

FIG. 3 is a partial side elevational view of a third embodiment of the eyeglass frame assembly shown in FIG. 1;

"FIG. 3A is a view taken along the lines 3A—3A of FIG. 3;";

FIG. 4 is a partial side elevational view of a fourth embodiment of the eyeglass frame assembly shown in FIG. 1;

FIG. 4A is a partial cross-sectional view of the lines 4A—4A shown in FIG. 4;

FIG. 4B is a partial perspective view of an alternative decorative member; and

DESCRIPTION OF THE PREFERRED EMBODIMENT

Figure 5:
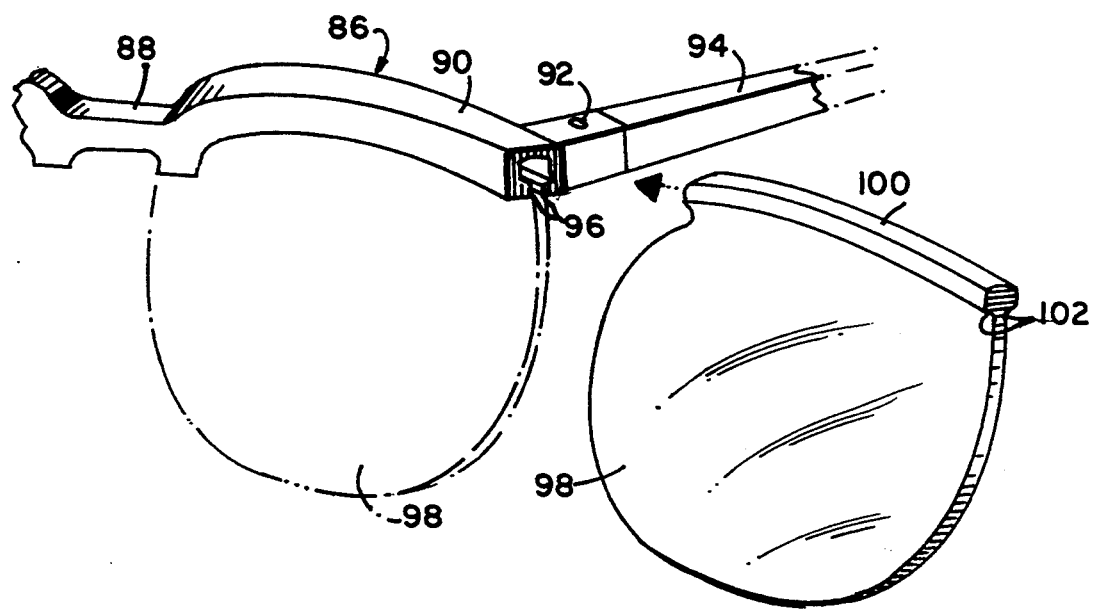
FIG. 5 is a partial side elevational view of a further eyeglass frame construction.

Referring now to the drawings in detail, and particularly to FIG. 1, there is shown elevational view of one side of an eyeglass assembly 10 having a frame 12 which includes a top bar 14 (shown for one side only) and a nose bridge 16. The top bar 14 in this preferred embodiment is arranged in secure engagement with an eyeglass lens 18. Each top bar 14 has a frame post 20 extending in a rearward direction therefrom, as shown in the figures. A hinge 22 is disposed on the distal end of the frame post 20. A frame arm 21, as is typical in eyeglasses, is attached to the hinge 22 the distal end of which (not shown) fits along the ear of the wearer.

Each lens 18 has a groove 24 disposed adjacent the periphery, preferrably on both the front 26 and back side 28 of the lens 18, as shown in the sectional view in FIG. 1A. The groove 24 extends around the bottom and sides of the lens 18 exclusive of the periphery adjacent the top bar 14. The groove 24 is of the order of about 3 mm. wide and about 1–2 mm deep. A replacable 'U'-shaped decorative member is matably disposably attachable with respect to the groove 24. The decorative member 30 being of "U"-cross-section has parallel edges 32 which are biased towards one another so as to engage the groove 24 around the lower periphery of the lens 18. The decorative member 30 may have colors or shape/characteristics different from that of the top bar 14 and/or frame arms 21.

FIG. 1B shows an "aviator" type eyeglass 15, typically known in the industry, however without an outer frame. A nose bridge 17 is secured to the backside of each lens 19, as also is its frame arm 21. The lens 19 has a peripheral groove 23 of about 2–4 mm. wide and about 2 mm. deep about both the front and backside of the lens 19 closely spaced from the periphery thereof by about 10 mm. A full wrap around decorative member 25 of generally U-shape in cross-section is shown awaiting snap-on attachment to the lens 19 in FIG. 1B. The decorative member 25 is preferably made from a flexible extrusion of plastic or the like. The decorative member 25 has parallel leg portions 27 with opposed inwardlt directed ridges 29 extending therealong, as shown in FIG. 1C, for intimately engaging the grooves 23 on each side of the lens 19. The decorative member 25 may extend around the entire periphery by merely wrapping the decorative member 25 around the periphery of the lens 19, and snapping it into the grooved 23 on the front and backside of the lens as shown in FIG. 1B.

In a further embodiment not shown here, the decorative member 30 may have design features such as silouetts of a wave or a flame or the like that flair up on the front side 26 of the lens 18, to present the wearer of the eyeglass assembly the option of decorating the lens 18 with a "decor" to fit any occasion or style.

FIG. 2 shows another embodiment of an eyeglass assembly 36, generally similar to the aforementioned embodiment of FIG. 1 having a top bar 38 as part of an eyeglass frame 40 in which a lens 42 is mated. The eyeglass frame 40 includes a lens rim 44 which engages the bottom and side portions of the lens 42 in a known manner, and abuts the top bar 38. The lens rim 44 has a front facing side 46, an edge 48 and a rearfacing side 50. An elongated channel 52 of inverted omega configuration in cross-section is disposed along the front facing side 50 of the lens rim 44, and may extend as well, into the top bar 38, although not shown in the top bar 38 here. An elongated flexible decorative insert 54 of a generally "T" cross-sectional shape as shown in FIG. 2A, may be snappably inserted into the channel 52. The elongated insert 54 may be of different color than the eyeglass frame 40, or the outwardly facing face 56 thereof may have indicia, textural characteristics, designs or a curvilinear configuration for decorative purposes.

A slight variation of this emodiment, is shown in FIG. 3, wherein the lens rim 44 has a plurality of openings 60 spaced therearound on the front side 46. The openings 60 may be of an inverted omega shape as indicated in the crosssectional view shown in FIG. 3A. A decorative pin 62 having an adaptable pin shaft 64 may be insertable into those openings 60, to provide changes in style and character to an eyeglass assembly 36 so configured.

In a slight change over the embodiment shown in FIG. 1, an eyeglass assembly 66, partially shown in FIG. 4 depicts a nose bridge 68, a top bar 70, an extension post 72 and a typical hinged arm 74 pivotable on the post 72. A lens 76 is secured to the top bar 70 and to a lens rim 78 which extends entirely around the rest of the periphery of the lens 76. This lens rim 78 is shown in cross-section in the sectional view shown in FIG. 4A. A flexible channel-like decorative attachment clip 80 is shown in exploded-view fashion in FIG. 4. The decorative clip 80 is of 'U'-shape in cross-section having edges 82 that overlap the edges 84 of the lens rim 78. The decorative clip 80 may be attached or removed from the eyeglass assembly 66 to change the color, texture or characteristic of that eyeglass assembly 66. A further variation of that decorative clip 81 is shown in FIG. 4B, wherein the clip 81 has flaired or embellished edges 83 on its front facing side 85 so as to present a varied pattern on the front side of the lens rim 78.

A further eyeglass concept is shown in FIG. 5, wherein a part of an eyeglass assembly 86 is shown, depicting a nose bridge 88, a top bar 90, an extension post 92 and a typical hinged arm 94 hingedly attached to the extension post 92. The top bar 90 is of inverted "U"-shaped channel having a pair of lowermost downwardly directed spaced apart parallel edges 96 biased towards one another. An eyeglass lens 98 has an upper edge 100 which mates within the top bar 90. The lens 98 has a pair of grooves 102 adjacent the upper edge 100 which receive the parallel edges 96 of the top bar 90. The lens 98 may also be grooved 104 in a manner similar to the lens 18 shown in FIG. 1.

The channel shaped decorative attachments in all of these embodiments are to be made as an extrusion, and may be sold in lengths to permit the ultimate consumer to cut to length and mold it/them to the shape of the lens periphery.

Thus what has been shown and described is a novel and unique eyeglass arrangement which enables the end wearer or user to be able to change the style, color or physical characteristics of his/her eyeglasses by simply removing a snap-on decorative attachment or by sliding a lens out of engagement with a portion of the eyeglass frame. The decorative members may be cut to length by the users themselves, when the member is the elongated extrusion of flexible plastic.

I claim:

1. An eyeglass frame assembly arranged for adaptation with decorative means, comprising:
    an arrangement of top bars connected by a nose bridge;
    a lens secured by each of said top bars and a lens frame peripherally engaging each of said lenses;
    a channel shaped decorative member replacably attachable to a groove extending around at least the side and lower periphery of each of said lenses, to permit said eyeglass frame assembly to be changed from one style to another by its wearer.

2. An eyeglass frame assembly as recited in claim 1, wherein said channel shaped decorative member has parallel sides with a pair of edges biased towards one another to effectuate its gripping onto said lens.

3. An eyeglass frame assembly as recited in claim 2, wherein one of said sides of said channel shaped decorative member has a flaired edge thereon, to comprise a decoration on said lens.

4. An eyeglass frame assembly as recited in claim 1, wherein said detachable decorative means comprises a snap-in insert receivable into said receiving means.

5. An eyeglass frame assembly as recited in claim 4, wherein said snap-in insert comprises an elongated T-shaped extrusion which is flexibly adapted to said lens frame.

6. An eyeglass frame assembly as recited in claim 4, wherein said receiving means comprises a plurality of groove openings for receipt of individual decorative inserts.

7. An eyeglass frame assembly as recited in claim 1, wherein said channel shaped decorative member has a color which is different from said top bar.

8. An eyeglass frame assembly as recited in claim 1, wherein said channel shaped decorative member are severable from an elongated extrusion, to permit a wearer to make the decorative means.

9. An eyeglass frame assembly as recited in claim 1, wherein said top bar comprises an inverted U-shaped channel member and said lens has an upper edge with a groove disposed therein adjacent the periphery of said upper edge, to permit said lens to be held in said U-shaped top bar channel.

10. An eyeglass frame assembly as recited in claim 9, wherein said U-shaped top bar has parallel lower edges which are biased towards one another to effectuate a gripping force onto said lens therebetween.

* * * * *